United States Patent [19]
Ellison

[11] Patent Number: 5,985,079
[45] Date of Patent: Nov. 16, 1999

[54] FLEXIBLE COMPOSITE SURFACING FILM AND METHOD FOR PRODUCING SAME

[75] Inventor: Thomas M. Ellison, Fort Mill, S.C.

[73] Assignee: Rexam Industries Corp., Charlotte, N.C.

[21] Appl. No.: 08/623,479

[22] Filed: Mar. 28, 1996

[51] Int. Cl.⁶ .................................................. B29C 47/06
[52] U.S. Cl. .............................. 156/244.23; 156/244.24; 156/244.27; 264/129
[58] Field of Search ........................... 264/173.1, 171.13, 264/342 RE, 129; 156/244.27, 244.24, 244.11, 500, 244.23

[56] References Cited

U.S. PATENT DOCUMENTS

| | | | |
|---|---|---|---|
| 3,679,506 | 7/1972 | Burgess et al. | 156/244.27 |
| 4,224,270 | 9/1980 | Pears . | |
| 4,585,701 | 4/1986 | Bartoszek et al. . | |
| 4,810,540 | 3/1989 | Ellison et al. . | |
| 4,913,760 | 4/1990 | Benson et al. | 156/244.11 |
| 4,943,680 | 7/1990 | Ellison et al. . | |
| 5,026,448 | 6/1991 | Reafler et al. . | |
| 5,114,789 | 5/1992 | Reafler . | |
| 5,132,148 | 7/1992 | Reafler . | |
| 5,192,609 | 3/1993 | Carroll, Jr. . | |
| 5,203,941 | 4/1993 | Spain et al. | 156/238 |
| 5,215,826 | 6/1993 | Shimanski et al. . | |
| 5,242,751 | 9/1993 | Hartman . | |
| 5,248,470 | 9/1993 | Dollinger et al. . | |
| 5,268,215 | 12/1993 | Krenceski et al. . | |
| 5,316,608 | 5/1994 | Ocampo et al. | 156/238 |
| 5,326,520 | 7/1994 | Franck et al. | 264/173.1 |
| 5,350,476 | 9/1994 | Edwards | 156/244.24 |
| 5,435,865 | 7/1995 | Lee et al. | 156/213 |
| 5,490,893 | 2/1996 | Enlow et al. | 156/230 |
| 5,506,031 | 4/1996 | Spain et al. | 428/172 |
| 5,653,927 | 8/1997 | Flynn et al. | 264/510 |

FOREIGN PATENT DOCUMENTS

| | | |
|---|---|---|
| 459 720 | 12/1991 | European Pat. Off. . |
| 0 285 071 B1 | 7/1992 | European Pat. Off. . |
| 50-9011 | 4/1975 | Japan ............................... 156/244.27 |
| 0 352 298 B1 | 11/1993 | WIPO . |
| WO 94/03337 | 2/1994 | WIPO . |
| 96/40449 | 12/1996 | WIPO . |
| 96/40480 | 12/1996 | WIPO . |
| 96/40519 | 12/1996 | WIPO . |

Primary Examiner—Jan H. Silbaugh
Assistant Examiner—Mark Eashoo
Attorney, Agent, or Firm—Alston & Bird LLP

[57] ABSTRACT

A flexible composite surfacing film for providing a substrate with desired surface characteristics is disclosed. The film comprises a flexible temporary carrier film and a flexible transparent outer polymer clear coat layer releasably bonded to the temporary carrier film, the flexible outer polymer layer comprising an extruded thermoplastic polymer having a $M_w/M_n$ ratio of 4 or lower. A pigmented base coat layer is adhered to said outer clear coat layer and is visible therethrough, and a thermoformable backing layer is adhered to the pigmented base coat layer. The film is produced by extruding a molten transparent thermoplastic polymer and applying the polymer to a flexible temporary carrier thereby forming a continuous thin transparent film. A pigmented thermoplastic polymer in a volatile liquid vehicle is applied to the exposed surface of the transparent film while the film is bonded to the flexible temporary carrier, thus forming thereon a coating of the pigmented thermoplastic polymer overlying the transparent thermoplastic polymer film. The thus formed composite may then be heated while the transparent thermoplastic polymer film is bonded to the flexible temporary carrier to evaporate the volatile liquid vehicle and form a pigmented polymer layer. The heating step also molecularly relaxes the underlying film of transparent thermoplastic polymer to relieve any molecular orientation caused by the extrusion.

32 Claims, 3 Drawing Sheets

FLEXIBLE COMPOSITE SURFACING FILM AND METHOD FOR PRODUCING SAME

FIELD OF THE INVENTION

The present invention relates to flexible surfacing films and their production, and more particularly relates to composite surfacing films which can be used to provide substrates with desired surface characteristics, and to a method of producing such films.

BACKGROUND OF THE INVENTION

It is often desirable to enhance certain surface characteristics of substrates such as, for example, exterior and interior body parts of automobiles. In particular, with regard to exterior automobile body parts, base coat/clear coat painted finishes have become quite popular. These finishes are conventionally applied by first painting a base coat, which may include metallic pigments, onto the body part and then painting a clear coat over the base coat. Both the base coat and the clear coat are typically applied by spraying. The base coat/clear coat painted finish thus can provide a "wet look" finish, with or without a metallic appearance, and can be used to produce a very high quality finish. In addition, because the clear coat protects the base coat, greater latitude can be used in pigment selection and loading in the base coat without the weatherability of the finish being unacceptably decreased.

Base coat/clear coat finishes, however, and particularly conventionally painted metallic finishes, pose significant pollution control problems arising from the evaporation of volatile paint solvents. Moreover, they are difficult to provide on plastic automobile body panels which are becoming a more popular mode of construction in the industry.

Accordingly, decorative composite surfacing films have been developed which can be applied to a substrate, such as an automobile body part, to impart the appearance of base coat/clear coat painted finishes. Exemplary films and methods for making and applying the same to automobile body parts are disclosed in U.S. Pat. Nos. 4,810,540; 4,931,324; 4,943,680; and 5,342,666 which are all incorporated by reference herein. These patents disclose composite surfacing films having a clear coat layer and an underlying base coat layer adhered thereto. After the films have been formed, they may be bonded to a plastic film or sheet and thermoformed into the final part; thermoformed into an insert for placement in a mold for resin injection to make the part; or placed directly into a mold, without preforming, for resin injection to make the part. The composite surfacing films thus provide a high quality decorative finish simulating that of a base coat/clear coat painted finish and substantially reduce or eliminate the emission control problems previously faced by manufacturers who wished to produce automobiles with base coat/clear coat finishes.

Another method of producing film materials of this type is disclosed in PCT International Application No. WO 94/03337 to Duhme et al. Duhme et al. discloses forming a clear coat layer by extrusion and then laminating the extruded clear coat layer to a PET carrier. A color layer may be cast onto a different carrier and then, after drying and removal of the carrier, laminated to the clear coat layer.

Extruded polymers typically take on a molecular orientation as a result of the extrusion process. During extrusion, the molecular chains become generally oriented in the machine direction as a result of the physical forces acting on the polymer as it is forced through the extrusion die. Molecular orientation, however, can have a deleterious effect on the resultant properties of the flexible surfacing film because various properties of the clear coat layer will become anisotropic. For example, the tensile strength of the clear coat layer will typically be greater in the machine direction (i.e., the direction of molecular orientation) than in the cross machine direction. The same may also be true of physical shrinkage when the surfacing film is later subjected to prolonged high temperatures, as in the thermoforming process. Dimensional instability is particularly troublesome with surfacing films as it may cause visual distortion or, in severe cases, delamination of the film or even debonding of the film from the substrate.

SUMMARY OF THE INVENTION

The present invention provides a flexible composite surfacing film which addresses many of the shortcomings and limitations of prior surfacing films and manufacturing methods therefor.

The present invention additionally provides a method by which flexible composite surfacing films of the type described may be produced in commercial quantities and with consistent high quality.

The composite surfacing film according to the present invention comprises a flexible temporary carrier film and a flexible transparent outer polymer clear coat layer releasably bonded to the temporary carrier film. The flexible outer polymer layer comprises an extruded thermoplastic polymer having a $M_w/M_n$ ratio of 4 or lower. A pigmented base coat layer is adhered to the outer clear coat layer and is visible therethrough, and a thermoformable backing layer is adhered to the pigmented base coat layer. In a preferred embodiment, the transparent thermoplastic polymer may be a polymer blend including a fluorinated polymer and an acrylic resin.

The surfacing film may be applied to a substrate to produce a shaped article having a contoured decorative outer surface, wherein the surfacing film is adhered to the substrate and conforms the contoured surface. In one embodiment of the invention, the surfacing film has the appearance of a base coat/clear coat paint finish when viewing the outer surface thereof, and the shaped article is thus suitable for use as an exterior automobile body part or panel.

It is desirable to form the flexible temporary carrier from a material that can withstand the molten temperature of the transparent thermoplastic polymer, such as polyethylene terephthalate. When a smooth glossy surface is desired, the temporary carrier desirably has a surface of such smoothness that the resultant composite surfacing film has a high gloss appearance after the temporary carrier has been stripped from the transparent thermoplastic film. This high gloss desirably duplicates the appearance of a glossy base coat/clear coat automotive paint finish with a 20° gloss of at least about 60%. Most desirably, the surface of the temporary carrier has an average surface roughness of less than 0.018 μm to impart a smooth glossy surface appearance with high distinctness of image (DOI) to the transparent film. This high degree of surface smoothness gives the resultant composite surfacing film the appearance of a base coat/clear coat automotive paint finish meeting automobile manufacturer's specifications for appearance properties such as gloss and DOI. Such surfacing films have a DOI of at least about 65% after the temporary carrier has been stripped from the transparent outer polymer clear coat layer. Alternatively, the temporary carrier may have a satin, matte or textured finish to impart a desired appearance. Further, the temporary carrier may be treated with lubricants, silicone compounds, or other materials that will transfer to the extrusion coating when the temporary carrier is removed. The transferred material may impart improved properties, such as abrasion resistance, without detracting from the appearance.

The continuous thin transparent outer polymer clear coat layer preferably comprises a blend of a polyvinylidene fluoride polymer having a $M_w/M_n$ ratio of 4 or lower with an acrylic polymer comprising an ethyl acrylate comonomer. It is formed by extruding the polymer composition to form a film and releasably bonding the film to the flexible temporary carrier. optionally, the continuous thin transparent clear coat layer may be provided by extruding first and second transparent thermoplastic polymers of differing compositions. The transparent clear coat layer would thus have outer and inner layers having different properties.

A pigmented thermoplastic polymer layer is then applied to the exposed surface of the transparent outer clear coat layer while the clear coat layer is bonded to the carrier. For example, the pigmented polymer in a volatile liquid vehicle may be coated or printed onto the transparent film.

According to one aspect of the invention, the composite may then be heated while the transparent thermoplastic polymer clear coat layer is bonded to the flexible temporary carrier to dry the pigmented polymer layer. The heating is also sufficient to molecularly relax the underlying film layer of extruded transparent thermoplastic polymer by heating the transparent thermoplastic polymer to a molten or substantially molten state to relieve any molecular orientation therein. The thus formed composite film is then allowed to cool.

A thermoformable backing layer may be laminated to the pigmented layer, such as by application of an adhesive, to impart to the composite surfacing film desirable durability and thermoforming properties. In addition, the flexible temporary carrier may be subsequently stripped from the transparent polymer film to thereby provide a thermoformable composite film laminate having the desired surface characteristics.

BRIEF DESCRIPTION OF THE DRAWINGS

Some of the features and advantages having been stated, others will appear as the description proceeds, when taken in conjunction with the accompanying drawings, which are not necessarily drawn to scale, in which—

DETAILED DESCRIPTION OF THE INVENTION

Figure 3:
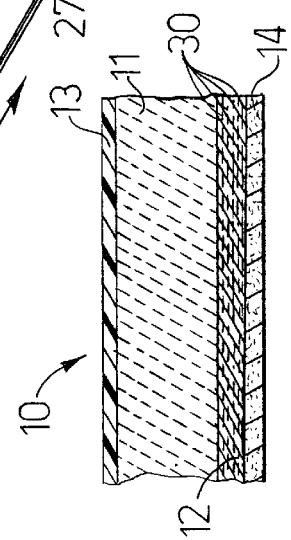
FIG. 3 is a cross sectional view of a composite surfacing film made according to the process of the present invention.

A flexible composite surfacing film 10 which may be produced in accordance with the present invention is illustrated in FIG. 3. The film 10 has an outer or front surface formed of a continuous thin transparent film layer 11 and an underlying pigmented thermoplastic polymer layer 12 bonded thereto. The flexible composite surfacing film 10 may also include a flexible temporary carrier 13 and a thermoformable backing layer 14, the functions of which are discussed in more detail below.

Figure 1:
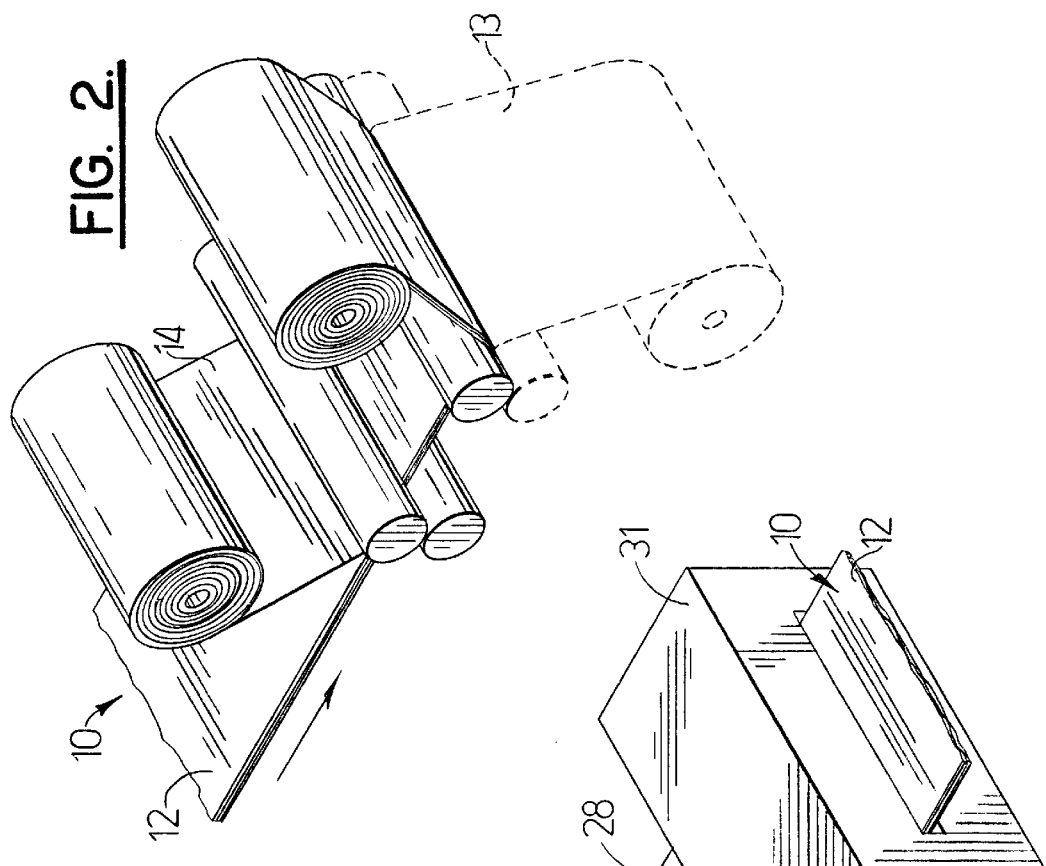
FIG. 1 is a perspective view showing a process for making a flexible composite surfacing film according to the present invention.

As illustrated in FIG. 1, the continuous thin transparent film layer 11 is formed by extruding a molten transparent thermoplastic polymer and subsequently applying the transparent thermoplastic polymer to a flexible temporary carrier 13. The continuous thin transparent film layer 11 is applied so as to be releasably bonded to the flexible temporary carrier 13.

The transparent thermoplastic polymer from which film layer 11 is formed may be extruded from a conventional screw extruder 16. The polymer is fed to the extruder 16 in the form of pellets or granules which are heated to a molten state and subsequently forced through a suitable film die 17. The die 17 may consist of a single slot opening designed to produce a single clear film layer, or it may be a coextrusion die designed to receive two or more molten polymer streams and to form a multilayer coextruded film. For purposes of the present invention, melt extruding the transparent film 11 is preferable to liquid casting because of reduced solvent emissions and the capability for increased line speeds. However, the extrusion process typically causes a certain degree of molecular orientation in the resultant transparent film layer 11, which may be undesirable.

Figure 5:
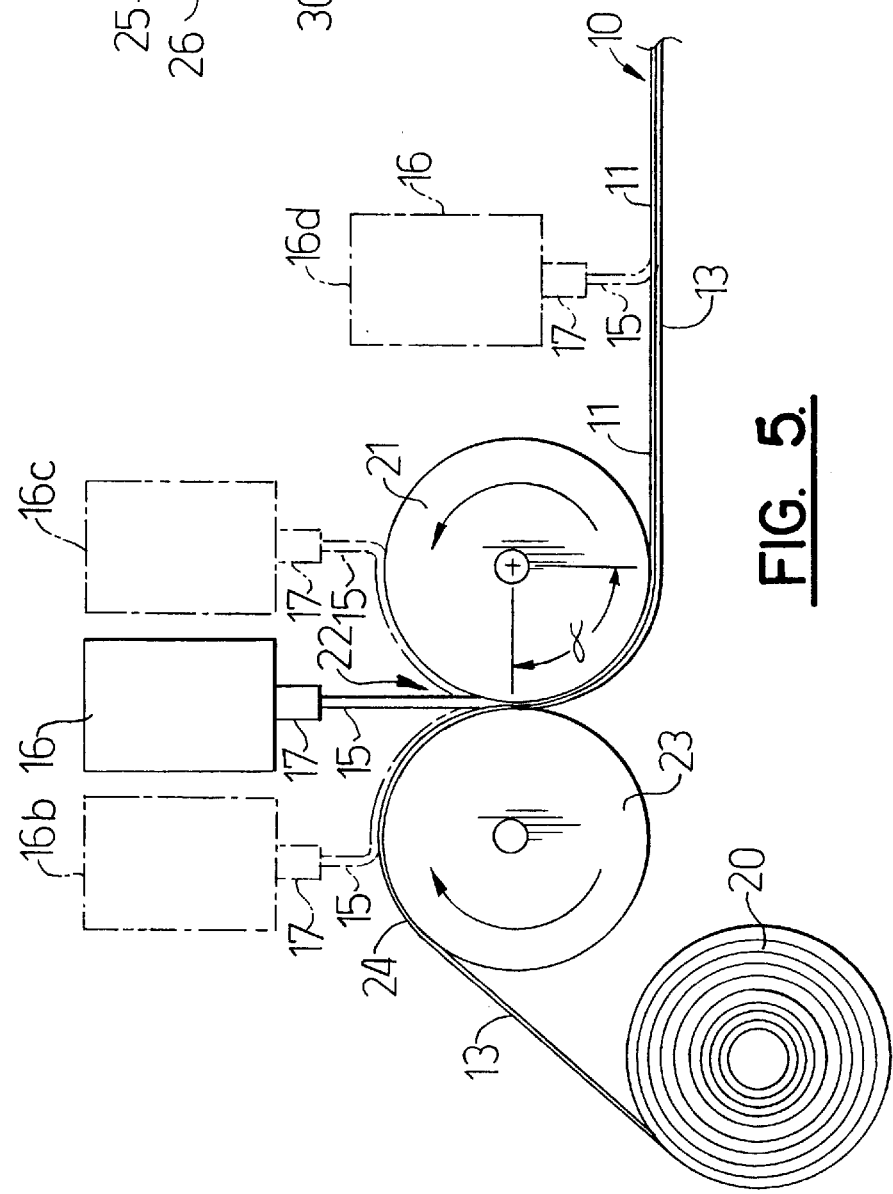
FIG. 5 is an elevational view of the extrusion section of the apparatus used to practice the present invention illustrating various positions of the extruder.

The flexible temporary carrier 13 may be unwound from a supply roll 20 and then directed into running contact with a rotating roll 21. Thus, as the flexible temporary carrier 13 approaches the surface of the rotating roll 21, it forms a converging throat 22 which narrows up to the point where the carrier runs onto the roll 21. The flexible temporary carrier 13 is then passed around a circumferential portion of the rotating roll 21, which is indicated in FIG. 5 by α. In the preferred embodiment shown, a second rotating roll 23 is placed opposite the first rotating roll 21 to form a nip therebetween. Accordingly, the carrier 13, upon being-unrolled from the supply roll 20, first comes into contact with roll 23 and then passes through the nip and around the roll 21.

As shown in FIG. 1 and in solid lines in FIG. 5, the extruder 16 is positioned directly above the converging throat 22 formed by the flexible temporary carrier 13 and the rotating roll 21. Thus, as the molten transparent thermoplastic polymer 15 is extruded, it falls directly into the converging throat 22. The flexible temporary carrier 13 is then passed around a circumferential portion, indicated at α, of the rotating roll 21 and the extruded polymer forms a continuous thin transparent film 11 between the flexible temporary carrier and the rotating roll. The transparent thermoplastic polymer is subjected to pressure between the flexible temporary carrier 13 and the rotating roll 21 as a result of tension on the carrier, which pressure may be desirable in facilitating the formation of the continuous thin transparent film 11 and its releasable bond to the carrier.

The extruder may also be placed in the position shown in dashed lines in FIG. 5 and labeled 16b. In this position, the extruder is disposed above the flexible temporary carrier 13 as the carrier passes over the second. rotating roll 23 and the molten transparent polymer 15 is applied to the exposed surface 24 of the carrier. By heating roll 23, this configuration can provide additional heat transfer to the transparent polymer, as discussed below. The movement of the carrier 13 around the second rotating roll 23 then directs the transparent thermoplastic polymer into the converging throat 22.

The extruder may alternatively be placed in the position labeled 16c where the extruder is positioned directly over the rotating roll 21. The transparent thermoplastic polymer 15 is applied to the surface of the rotating roll 21 and it is then directed into the converging throat 22 by the rotation of the roll 21.

In certain situations, the rotating roll 21 may have a roughened surface when it is desirable to impart a matte finish to the exposed surface of the thin transparent film 11, which may improve bonding of the pigmented polymer layer 12. In all three of the above described positions 16, 16b, and 16c, the extruded molten transparent thermoplastic polymer is directed into the converging throat 22 and then pressed against the circumferential portion α of the rotating roll 21 by the flexible temporary carrier 13.

The extruder may also be disposed in the position shown in dashed lines in FIG. 5 and labeled 16d. In this position, the molten transparent thermoplastic polymer is extruded directly onto the exposed surface 24 of the flexible temporary carrier 13 downstream of the rotating roll 21.

The thickness of the transparent film 11 which is applied to the carrier 13 is dependent on many variables including the polymer melt properties; various extruder parameters, such as the die gap opening and pump speed; and the line speed and tension of the carrier 13. The thickness of the transparent film layer 11 can be adjusted to account for the particular application for which the composite surfacing film 10 is intended. The thickness of the transparent film 11 used in a base coat/clear coat automotive surfacing film may range from about 0.5 to about 50 thousandths of an inch, and preferably from about 0.5 to about three thousandths of an inch.

The transparent film layer 11 is formed from a weatherable polymer composition selected to provide a film which will not significantly fade, peel, crack, or chalk when exposed to the environment, for the intended life of the substrate for which the composite surfacing film is made. Additionally, the transparent film layer 11 must be formable from a two-dimensional surface into a three-dimensional surface without objectionable loss of appearance properties. In an "in-mold" surfacing process, the forming of the sheet material into a three-dimensional configuration is achieved by placing the flat (two-dimensional) decorative sheet material in the mold and causing the sheet to be formed into a three-dimensional configuration while in the mold, either through the action of the injected plastic material alone, or with the assistance of vacuum, pressure, movable mold cores, or a combination of these. In an "insert molding" operation, the sheet material is heated and preformed with vacuum and/or pressure into a three-dimensional insert, and this preformed insert is then placed in the mold.

Dynamic mechanical thermal analysis (DMTA) is a method useful in characterizing the mechanical properties of polymer compositions at various temperatures. Polymers may exist either in the melt, glassy, rubbery or leathery states depending on the ambient temperature. Films suitable for in-mold surfacing processes or insert molding processes should be in the rubbery state at the temperature of forming. The transparent: film layer 11 should preferably have a storage modulus, E', measured by DMTA in the range of 5 to 15,000 psi measured at the forming temperature. In insert molding processes, the forming temperatures may typically be relatively high, e.g. 160° C. (320° F.). For in-mold surfacing processes, the polymer composition needs to be in the rubbery state at a lower temperature, e.g. about 60° C. (140° F.).

The transparent polymer composition for film layer 11 may include UV screeners to increase weatherability, antioxidants, heat stabilizers and other conventional additives. Additionally, although denominated herein as "transparent" the polymer composition may contain pigments or dyes to impart a slight tint to improve appearance and weatherability. A number of known testing procedures, in which objects are exposed to either the natural environment over an extended time or a harsh artificial environment for a short time, are used to determine the weatherability of polymers.

The polymer composition used for film layer 11 should preferably comprise a polymer having a $M_w/M_n$ ratio of 4 or lower. As is well known to the skilled artisan, the $M_w/M_n$ ratio represents the molecular weight distribution, where $M_w$ is the weight average molecular weight and $M_n$ is the number average molecular weight. Preferred weatherable polymers include thermoplastic fluoropolymers, acrylic polymers, and blends thereof.

Acrylic polymers useful for practicing the present invention are obtained from a variety of acrylic monomers, such as acrylic and methacrylic acids, and their amides, esters, salts, and corresponding nitriles. Suitable monomers for such polymers include methyl methacrylate, ethyl methacrylate, and ethyl acrylate. The polymers may be in the form of homopolymers, copolymers or terpolymers. A preferred acrylic polymer composition is a copolymer of a methacrylate monomer and an ethyl acrylate monomer. Copolymers of methyl methacrylate with ethyl acrylate are particularly preferred. The copolymer preferably has an ethyl acrylate content of at least 1% by weight, more desirably from 5% to 15%, and most preferably from 10% to 15% by weight ethyl acrylate with the balance methyl methacrylate. High methyl methacrylate content copolymers have been found to produce brittle films when the film is formed by liquid casting. However, these copolymers exhibit excellent flexibility when melt processed pursuant to the present invention.

Preferred fluoropolymers useful for practicing the present invention include polyvinylidene fluoride homopolymers and copolymers. Polyvinylidene fluoride polymers are commercially available from various sources, as for example, KYNAR from Elf Atochem. The fluoropolymer should preferably have a $M_w/M_n$ ratio of 4 or lower. KYNAR grade 720 has a $M_w/M_n$ of 2.7; KYNAR grade 740 has a $M_w/M_n$ of 2.9 and KYNAR grade 2800 has a $M_w/M_n$ of 3.6. In addition, copolymers of vinylidene fluoride with other monomers such as trifluoroethylene, tetrafluoroethylene, hexafluoropropylene and monochlorotrifluoroethylene may be employed. Vrinylidene fluoride/hexafluoropropene and vinylidene fluoride/perfluoro (alkyl vinyl ether) dipolymers and terpolymers with tetrafluoroethylene are additional illustrative fluoropolymers.

A particularly preferred weatherable polymer composition for use in the present invention is a blend of a polyvinylidene fluoride polymer having a $M_w/M_n$ ratio of 4 or lower with an acrylic polymer comprising an ethyl acrylate comonomer. Desirably, for good scratch resistance of the outermost exposed surface, the polymer blend comprises about 40 to 85 weight percent polyvinylidene fluoride and 15 to 60 weight percent acrylic polymer.

Figure 6:
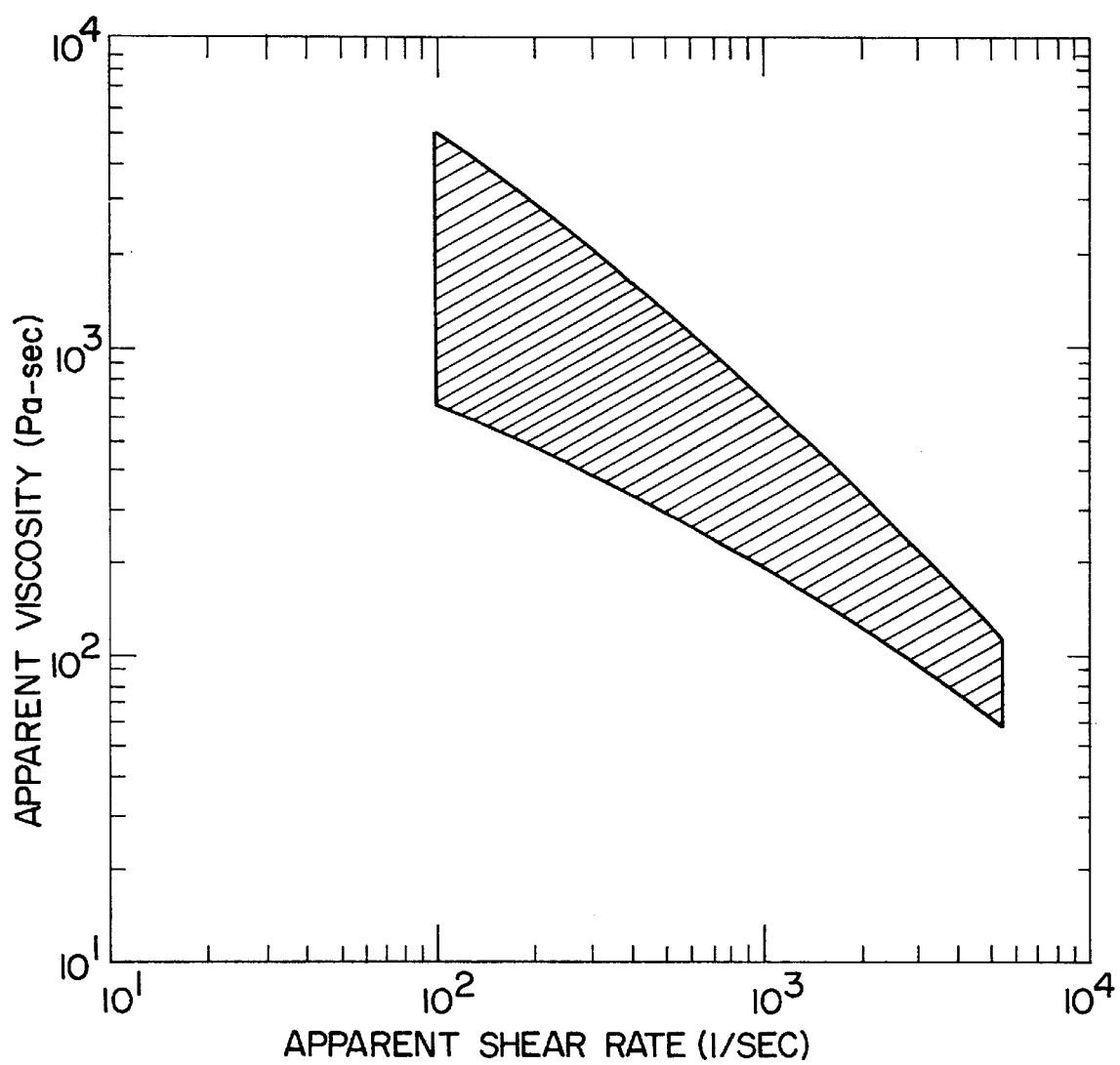
FIG. 6 is a graph showing a preferred range for the shear viscosity at various shear rates for polymer compositions useful in the present invention.

Polymer compositions useful in the present invention for producing the transparent film layer 11 may also be characterized by their Theological properties. The polymer composition should have a melt flow rate, measured by ASTM 1238 at 230° C. with a 5000 gm weight, of 5 g/10 minute or greater, more preferably at least 10 g/10 minute, and most desirably about 20 g/10 minute or higher. In addition, the shear viscosity of the polymer composition, measured by ASTM D3835-90 at 230° C., should be at least 70 Pa-sec at a shear rate of 5000 $sec^{-1}$ and at least 650 Pa-sec at a shear rate of 97 $sec^{-1}$, and below about 3500 Pa-sec at a shear rate of 97 $sec^{-1}$ and below about 100 Pa-sec at a shear rate of 5000 $sec^{-1}$. Desirably, the shear viscosity should fall within the region indicated by the shaded area in the graph of FIG. 6. Additionally, the storage modulus, E', measured by DMTA preferably should be in the range of 5 to 15,000 psi measured at 60° C. (140° F.).

Figure 4:
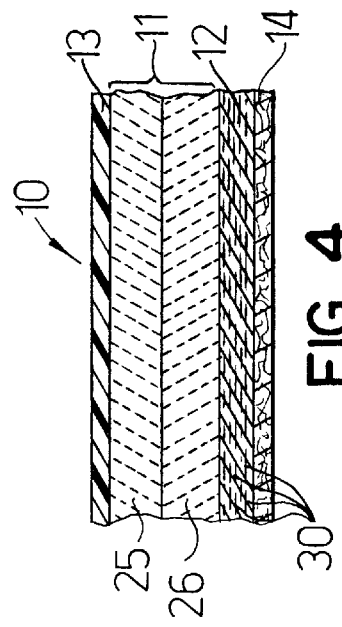
FIG. 4 is a cross sectional view of another embodiment of a composite surfacing film made according to the process of the present invention having a transparent film with inner and outer layers.

In one advantageous embodiment of the present invention, the thin continuous transparent film 11 may be formed with outer 25 and inner 26 layers of differing properties, as illustrated in FIG. 4. The outer 25 and inner 26 layers may be formed of transparent thermoplastic polymers having different compositions so as to provide layers with different properties. For example, both layers 25,26 may be formed of a blend of a fluorinated polymer and an acrylic resin. However, the outer layer 25 may be more rich in the fluorinated polymer to enhance the weatherability of the surfacing film 10. Conversely, the inner layer 26 may be more rich in acrylic resin to improve bonding to the pigmented layer 12, increase the amount of UV screener which may be added, and decrease the amount of fluorinated polymer used, which may be more expensive than the acrylic resin. In this embodiment, the fluoropolymer rich outer layer may desirably comprise about 50 to 85 weight percent fluoropolymer and 15 to 50 weight percent acrylic polymer, and the acrylic rich inner layer may comprise about 0 to 45 weight percent fluoropolymer and 55 to 100 weight percent acrylic polymer. In addition, the inner layer 26 may be enhanced visually with dyes, pigments or metallic flakes to provide desired visual properties.

Both polymers may be coextruded from the same die as is known in the art of extrusion. Alternatively, the outer 25 and inner 26 layers may be applied to the carrier 13 separately from independent extruders, each of which may be positioned at any of the various extruder positions discussed above. For example, the first polymer may be applied to the carrier 13 from an extruder in the position labeled 16b over the second rotating roll 23 so as to form the outer layer 25, and the second polymer may be extruded from a second extruder in the position labeled 16c over the first rotating roll 21 so as to be applied to the exposed surface of the outer layer 25 and form the inner layer 26. If the polymers are coextruded, it is desirable that the melt flow rates of the two compositions be similar. Desirably, the melt flow rates should be within about 25% of one another.

Other decorative effects may be applied to the back of the inner layer 26 or between the outer 25 and inner 26 layers, or both, such as printing (gravure, screen or flexography), tinting, vacuum metallizing, vacuum metallizing with tinting or vacuum metallizing with hologram printing.

The flexible temporary carrier 13 should have good dimensional stability and tensile strength at the elevated temperatures used in processing, e.g. 300° F. or higher. A preferred flexible temporary carrier 13 for use in the invention is a polyethylene terephthalate (PET) film. PET films useful as carriers for casting are manufactured in a number of grades depending on end use requirements. Several different grades of Hostaphan® PET film from American Hoescht may be useful in practicing the present invention. Most grades contain particulate material such as clay to slightly roughen the surface for improved slip. While this roughening improves film winding and handling, it increases surface haze and reduces distinctness-of-image (DOI) of films cast on such surfaces. For low haze and high DOI, the preferred PET film for use in the present invention has no slip additive. Such films are commercially available with one side treatment or knurled edges to facilitate winding. In general, PET films having at least one smooth surface with an average surface roughness, $R_a$, of about 0.018 $\mu$m or less are useful for this invention to yield a surfacing film with a DOI of 65 percent or greater and 20° gloss of at least about 60 percent. Other materials which may be used for the temporary carrier include PETG, polyamides such as nylon-6, and polyolefins such as linear low density polyethylene.

Alternatively, the temporary carrier 13 may be textured or embossed to give a desired surface appearance to the transparent film. A film made of polypropylene or oriented polypropylene (OPP) may also be a suitable carrier if the heating steps, as more fully discussed below, are kept below the heat distortion temperature of the polypropylene.

After the continuous thin transparent film 11 has been formed on the flexible temporary carrier 13, a pigmented thermoplastic polymer 27, which may be in a volatile liquid vehicle, is applied to the exposed surface of the transparent film, thereby forming thereon a coating 28 of the pigmented thermoplastic polymer overlying the transparent thermoplastic polymer film as shown in FIG. 1. The volatile liquid may be a solvent or a dispersant or any other liquid suitable for transporting the pigmented polymer 27 to the transparent film 11 and being subsequently evaporated therefrom. Accordingly, various application methods may be employed, such as roll coating, curtain coating, knife coating, spray coating, slot die coating, cascade or slide coating and printing. The pigmented polymer 27 may also be extruded onto the transparent film 11.

The foregoing procedure is preferably used to coat the entire undersurface of the transparent film 11. If desired, a striking visual effect can be achieved by applying a liquid pigmented polymer of one color to portions of the undersurface of the transparent film 11, after which a pigmented polymer of a different color may be applied to the other portions of the undersurface of the transparent film. This technique can be used to provide composite surfacing films which have a two-tone colored appearance, and the coatings can overlap so that the colored regions provided by this technique feather into one another. In combination, these two polymer coatings provide an opaque and uninterrupted (in opacity) coating to the undersurface of the transparent film 11.

The pigmented coating 28 is preferably formed of the same polymer family as the transparent film 11, or may optionally be formed of a different polymer which will bond to the transparent film during the manufacture of the composite surfacing film 10. For example, the pigmented coating 28 may comprise an acrylic polymer, a blend of an acrylic polymer with a fluoropolymer, or a blend of an acrylic polymer with a vinyl polymer. Pigments are dispersed in the polymer at a suitable concentration to color the coating, and preferably to form a substantially opaque coating layer of the desired color. The specific pigments are selected as desired depending upon the desired color. When the composite surfacing film 10 of the invention is used in automobile body applications, the pigments are selected so that the pigmented layer 12 will match the automotive paint standard, and the pigments employed may include conventional nonmetallic pigments as well as metallic pigments.

In the embodiments illustrated in FIGS. 3 and 4, the pigmented layer 12 has a metallic finish and, to this end, the coating has reflective flakes 30 uniformly distributed therein. The reflective flakes 30 may, for example, comprise aluminum flakes or mica flakes. Mica flakes used in the present invention may be untreated, or tinted or otherwise surface treated, as known in the art. The reflective flakes 30 are oriented generally parallel to the transparent film 11, with the flakes preferably being oriented so that the mean angle of inclination of the flakes to the outer film is less than about 6.5 degrees. This orientation typically occurs because of the evaporation of the volatile liquid vehicle. The precise limits of the angle of inclination depend on a number of conditions, including the particular type of reflective flakes 30 used, the composition of the pigmented polymer 27, and the drying conditions used to evaporate the volatile liquid vehicle.

After the application of the pigmented thermoplastic polymer 27 to the transparent film 11, the thus formed composite is heated to evaporate the volatile liquid vehicle and to form a pigmented polymer layer 12. As illustrated in FIG. 1, the composite may be passed through a drying oven 31 wherein the wet pigmented coating 28 is subjected to one or more zones of heated convective air, which evaporates substantially all of the volatile liquid vehicle. Alternatively, infrared or other radiant heating means may be used. The temperature in the drying oven 31 may be varied dependent upon the volatility of the vehicle and the period during which the surfacing film 10 is in the oven.

In the embodiment illustrated, the temperature and the residence time in the drying oven 31 are such that the surfacing film reaches a temperature which is at or near the onset of melting for the polymer composition of the transparent film layer 11 as measured by differential scanning calorimetry. As a result, the polymer chains present in the film become mobile, and any minimal orientation resulting from the extrusion process is substantially eliminated. Although lacking tensile strength in this heated state, the transparent film 11 is nevertheless supported by the much stronger flexible temporary carrier 13. The transparent polymer film 11 thus becomes substantially molecularly unoriented or relaxed and any anisotropic properties of the film are removed. This process, which is referred to herein as "molecularly relaxing," renders the continuous thin transparent film 11 substantially isotropic. The difference in the properties of the extruded film before and after the molecular relaxation can be observed visually by birefringence when the film is placed between crossed polarizing lenses. The presence or substantial absence of molecular orientation can also be observed by exposing an unsupported film to a heated environment at 350° F. and observing any dimensional change. Desirably, the dimensional change in the MD and CD is 10 percent or less. If desired, the continuous thin transparent film 11 may additionally, or alternatively, be molecularly relaxed by control over placement of the extrusion die, line speed and optional heating of the rotating roll 21 as discussed above. Molecular orientation can be essentially eliminated if the extrudate remains molten until it is supported on the temporary carrier. This can be achieved by positioning the extrusion die in close proximity to the converging throat 22 between the flexible temporary carrier 13 and the surface of the roll 21, and/or by running the process at a sufficiently high line speed that the extruded polymer is not quenched or hardened before it contacts the temporary carrier. Alternatively, if the extruded polymer has already become partially or totally quenched or solidified and taken on a molecular orientation when it is directed into the converging throat 22, the rotating roll 21 may transfer sufficient heat to the continuous thin transparent film 11 to again transform it to a molten state, thereby molecularly relaxing the transparent film and undoing any molecular orientation caused by the extrusion. Once again, although the transparent thermoplastic polymer 15 does not have any appreciable tensile strength at this point, the polymer will be supported by the temporary carrier 13.

As would be understood, more heat is applied if the extruder 16 is at the position labeled 16c than at the position labeled 16a because of the longer period during which the transparent polymer 15 is against the rotating roll 21. In addition, if the second rotating roll 23 is also heated, more heat is applied at the position labeled 16b than at the position labeled 16a. For a fluoropolymer acrylic blend, a roll temperature of about 40° C. or higher can be employed proper molecular relaxation, although it will be understood that a preferred roll temperature for a specific application will depend in part on the physical properties of the actual transparent polymer used and upon the machine configuration.

In any of these positions 16a, 16b and 16c, it may not be necessary for the composite surfacing film 10 to be further heated after the pigmented polymer 27 has been applied. For example, if the pigmented polymer 27 is applied in a manner which avoids the need for evaporation of a liquid vehicle, such as if the pigmented layer is extruded, it is not necessary to further heat the transparent film 11 in an oven 31 if it has been heated and molecularly relaxed by the rotating rolls 21,23 or by the heat imparted by the second extrusion.

Figure 2:
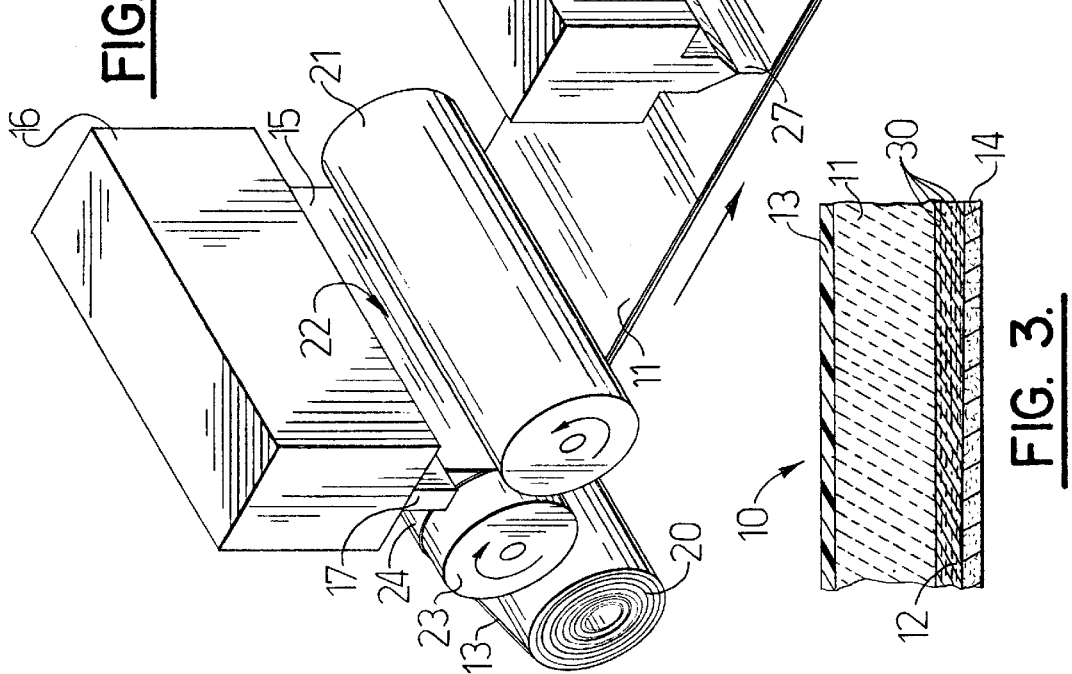
FIG. 2 is a perspective view of a further step in the process by which a thermoformable backing layer is applied to the composite surfacing film.

The composite surfacing film 10 may then be subjected to further processing including the lamination of et thermoformable backing layer 14 thereto, as illustrated in FIG. 2. In addition, as shown in the dashed lines of FIG. 2, the carrier 13 may also be stripped away.

The processes illustrated in FIG. 2 may be performed on the same line as the processes illustrated in FIG. 1. Alternatively, if the processing speeds are different, the surfacing film 10 may be wound up at the end of the line shown in FIG. 1 and then moved to a separate line where it is unwound for the processing steps of FIG. 2.

The thermoformable backing layer 14 provides strength to the surfacing film 10 during its application to the substrate and can cover many surface topology defects, such as small bumps or holes, which would otherwise show through the surfacing film. In addition, the backing layer 14 may be pigmented to a selected color compatible with the pigmented layer 12 to ensure complete opacity of the composite surfacing film 10. For example, the pigmented layer 12 may be thinned during thermoforming to a point where the substrate would show through the pigmented layer. If so, the pigmented backing layer 14 may provide additional opacity to ensure complete opacity of the film 10. In addition, it may be desirable to decrease the pigment concentration in the pigmented layer 12 when a pigmented backing layer 14 is used, for reduced cost and other reasons.

The backing layer 14 may be formed of a thermoformable thermoplastic polymer having a thickness of from about 0.5 to 100 thousandths of an inch. The backing layer 14 may comprise a coating or preferably a film laminated to the pigmented coating. Bonding of the pigmented layer 12 to the backing layer 14 can be achieved in accordance with known laminating procedures, and with known adhesives. One advantageous adhesive is a reactive, solventless urethane wherein the reactive components are mixed in-line.

The backing layer 14 may be selected to bond to the substrate for which the composite surfacing film 10 is intended. For example, a composite surfacing film 10 having a fusible olefin backing layer 14 can be placed in a mold prior to injection of an olefin resin. Another approach is to bond a PVC film to a fluoropolymer pigment layer with an acrylic adhesive and, in turn, bond the PVC film to an olefin film with a polyester isocyanate adhesive. Alternatively, the pigmented layer 12 may be bonded directly to thermoplastic olefin, polypropylene and other substrates with moisture cure urethane adhesives such as NC 222 from the ICI Company. The pigmented layer 12 may also be laminated to an olefin film with a permanent type acrylic pressure-sensitive adhesive. Still another approach is to coat the pigmented layer 12 with a soluble olefin resin which adheres thereto and bonds to the injected resin without having or requiring an olefin film layer. Such a resin is chlorinated polyolefin 343-1 from Eastman Kodak. This resin may be used in conjunction with an acrylic primer or ingredient to bond to desired fluorocarbon films.

Corona treatment of the olefin surface to be bonded to the pigmented layer 12 may optionally be used to achieve an optimum bond. Bonding may also be improved by surface treating the pigmented layer 12, such as by corona treatment. In similar fashion, acrylonitrilebutadiene-styrene, acrylonitrilebutadiene-styrene/polycarbonate, polycarbonate, polybutylene terephthalate, polybutylene terephthalate/polycarbonate, polystyrene, polyethylene terephthalate glycol (PETG), nylon or other films that will bond to the particular injected plastic may be laminated to the pigmented layer 12 with one or more of the named adhesives and used in turn to bond the surfacing film 10 to injected or extruded melt bondable resins.

The composite surfacing film 10 of the present invention can be adhered to a supporting substrate in accordance with known laminating or bonding techniques. Illustrative examples of supporting substrates include metal, wood, and molded polymer substrates. As explained above, particularly suitable shaped articles for the present invention are exterior automobile body parts such as body panels and bumpers.

The composite surfacing film 10 can be bonded to molded polymer substrates by placing the film into a mold having a contoured, three-dimensional molding surface. A moldable polymer is then introduced into the mold on one side of the surfacing film 10. The surfacing film 10 is then molded into a contoured three-dimensional configuration conforming to the molding surface of the mold, while molding the polymer to form a shaped article with the composite surfacing film adhered to the outer surface thereof. Preferably, the composite surfacing film 10 includes a backing layer 14, as described above, formed of a polymer different from the pigmented layer 12, wherein the composite surfacing film is placed into the mold with the backing layer oriented inwardly away from the molding surface so as to become adhered to the moldable polymer.

Suitable polymers for the molded polymer substrate include, for example, polyvinyl chloride, polycarbonate, polystyrene, acrylonitrile-butadiene-styrene, polyethylene, polypropylene, thermoplastic olefin, styrene/polyphenylene oxide (Noryel), acrylonitrilebutadiene-styrene/polycarbonate, polybutylene terephthalate, polybutylene terephthalate/polycarbonate, polyethylene terephthalate glycol (PETG), nylon, and RIM urethanes. Polyolefin homopolymers and copolymers (ionomers, etc.) are inexpensive thermoplastic resins which have excellent molding properties and are particularly preferred for practicing the present invention. Polypropylene, for example, when glass filled and foamed with a blowing agent, has performance properties suitable for structural or engineering uses. Acid copolymers of polyethylene, such as Du Pont's "SURLYN" are similar in performance and in addition have exceptional toughness.

The present invention and many of its features and advantages are illustrated in the following examples:

EXAMPLE 1

The following clear formula was dry blended and then melt compounded through a twin screw extruder:

| Component | Weight % | Supplier |
|---|---|---|
| Polymethylmethacrylate (PMMA) | 34.5 | Elvacite 2021 ICI |
| Polyvinylidene Fluoride (PVDF) | 63.75 | Kynar 740 Elf Atochem |
| UV Screener | 1.0 | Tinuvin P Ciba Geigy |
| Hindered Amine Stabilizer | 0.5 | Tinuvin 622 Ciba Geigy |
| Antioxidant | 0.25 | Irganox 1010 Ciba Geigy |
| Heat Stabilizer | 0.25 | Irgafos - Ciba Geigy |

The extruder zone temperatures were:

| | Zone: | | | | | | |
|---|---|---|---|---|---|---|---|
| | 1 | 2 | 3 | 4 | 5 | 6 | 7 |
| Temp ° C.: | | | | | | | |
| set | 185 | 190 | 200 | 200 | 200 | 185 | 175 |
| actual | 176 | 185 | 208 | 216 | 217 | 213 | 176 |
| Throughput: | 368 grams per minute | | | | | | |

The resulting compound had a $T_g$ mid point of 56.4° C. and an upper melting point of 169.4° C., as measured by DSC.

EXAMPLE 2

A formulation as in Example 1 was prepared, except that the Kynar 740 was replaced as follows:

| Kynar 740 (PVDF) | 57.37% |
|---|---|
| Kynar 2800 | 6.38 |

(PVDF/HFP Co-polymer)
Extruder Zone Temperatures were:

| | Zone: | | | | | | |
|---|---|---|---|---|---|---|---|
| | 1 | 2 | 3 | 4 | 5 | 6 | 7 |
| Temp ° C.: | | | | | | | |
| set | 185 | 190 | 200 | 200 | 200 | 185 | 175 |
| actual | 174 | 190 | 215 | 219 | 218 | 216 | 177 |
| Throughput: | 363 grams per minute | | | | | | |

The resulting compound had a $T_g$ mid point of 54.4° C. and an upper melting point of 170.6° C., as measured by DSC.

EXAMPLE 3, 4, AND 5

Examples 3 and 4 comprised compounded resin from Examples 1 and 2 respectively extrusion coated onto 0.002" thick ICI Melinex 455 biaxially oriented polyester film. The extrusion coating thickness varied from 0.001" to 0.0025". The extrusion die was arranged to extrude onto a matte finished chill roll followed by immediate nipping to the polyester film. A releasable bond was obtained between the extruded coating and the PET in all cases.

The extruder was set up as follows:

| Size 1", L/D: | 24:1, HP: 3, |
|---|---|
| Screw Design: | 3:1 |
| Line speed: | 12 feet per minute |
| Chill roll Temp ° C.: | 71 |

| | Zone Temp ° C. | | | | |
|---|---|---|---|---|---|
| | 1 | 2 | 3 | Die Temp | Melt Temp |
| Example 3 (Formula from Example 1) | 190 | 207 | 213 | 231 | 221 |
| Example 4 (Formula from Example 2) | 199 | 218 | 217 | 231 | 226 |

A control sample, Example 5, was prepared by liquid casting a clear fluoropolymer/acrylic blend composition (Fluorex) onto 0.002" Melinex 455 at a dry coating thickness of 0.001". The tensile strength, percent elongation at rupture and dimensional stability of Examples 5, 6 and 7 after removal from the PET carrier were tested in comparison to other commercial extruded films (Tedlar PVF and Korad Acrylic) in both the machine direction (MD) and transverse direction (TD) and the results are set forth in the table below. Dimensional Stability was measured as the percent shrinkage of free film after exposure to 177° C. for 5 minutes.

| | Tensile Strength (PSI) | | % Elongation | | Dimensional Stability | |
|---|---|---|---|---|---|---|
| Example No. | MD | TD | MD | TD | MD | TD |
| 3 | 8519 | 4296 | 252 | 372 | 84 | 24 |
| 4 | 7466 | 2471 | 225 | 400 | 82 | 16 |
| 5 (control) | 3050 | 3100 | 95 | 55 | 2 | 2 |
| Tedlar PVF | 14000 | 21400 | 112 | 96 | 24 | 36 |
| Korad (Acry.) | 3774 | 3032 | 45 | 49 | 38 | 6 |

As can be seen, the extruded examples exhibited anisotropic properties in comparison to the control.

EXAMPLE 6 AND 7

The extrusion coated surface of the products of Examples 3, 4 and 5 were then coated with a pigmented liquid formula to yield a base coat/clear coat film having the visual properties of a base coat/clear coat (BC/CC) automotive paint. Example 6 was made using the extrusion coated film of Example 3 and Example 7 was made with the extrusion coated film of Example 4.

A black pigment dispersion was prepared from the following formula:

| | Weight % | Supplier |
|---|---|---|
| Pigment Pearl 1300 | 10 | Cabot |
| Acryloid B72 (acrylic resin) | 30 | Rohm and Haas |
| MEK Solvent | 48 | |
| Toluene | 12 | |

Ten parts by weight of this black pigment dispersion was blended with 90 parts by weight of a liquid fluoropolymer/acrylic polymer composition of the following formulation:

| | Weight % | Supplier |
|---|---|---|
| Kynar PVDF dispersed powder | 30 | Elf Atochem |
| Elvacite 2042 (PEMA) | 10 | ICI |
| Solvents: | | |
| Dimethyl Phthalate | 30 | |
| Glycol ether DB Acetate | 30 | Shell |
| Exxate 600 | 30 | Exxon |

The black pigmented formula was adjusted with solvent to a viscosity of 18,000 cps and the formula was coated onto extruded clear layer of the samples of Examples 5, 6 and 7 with a lab doctor blade to yield a dry base color coat thickness of 0.0015". The coated samples were dried in lab ovens at 70° C. for two minutes followed by 2 minutes at 204° C. The samples were then retested for tensile strength, percent elongation and dimensional stability with the following results:

| | Tensile Strength (PSI) | | % Elongation | | Dimensional Stability | |
|---|---|---|---|---|---|---|
| Example No. | MD | TD | MD | TD | MD | TD |
| 6 | 4500 | 4000 | 322 | 337 | 1 | 1 |
| 7 | 3862 | 4379 | 342 | 336 | 1 | 1 |
| 5 (control) | 4000 | 3714 | 427 | 292 | 1 | 1 |

As can be seen, the physical properties of the extrusion coated films after coating and drying of the base coat are substantially balanced in the machine direction (MD) and in the transverse direction (TD), similar to the desirable balanced properties typical of liquid cast films.

Samples from Examples 5, 6, and 7 were then nip laminated with the PET carrier in place to adhere the pigment coated surface of the samples to adhesive coated aluminum panels. The PET carrier layer was removed for visual evaluation and measurements. The samples exhibited no "orange peel" and, in general, gave the appearance of a high quality automotive BC/CC paint. Gloss, distinctness of image (DOI) and haze were measured with a Hunterlab Dorigon instrument, with the results shown in the following table. Abrasion resistance was measured qualitatively by comparing samples which had been rubbed with a felt probe for the same number of cycles. The visual appearance and abrasion resistance of the samples were rated on a scale of 1 to 6 where 1 is best and 6 is worst.

| Example No. | Gloss | | | Haze | | | Visual Rating | Abras. Resist. |
|---|---|---|---|---|---|---|---|---|
| | 20° | 60° | DOI % | 2° | 5° | 15° | | |
| 6 | 65.6 | 77.1 | 95.7 | 0.1 | 0 | 0 | 3 | 2 |
| 7 | 67.7 | 78.8 | 90.0 | 0.1 | 0 | 0 | 5 | 2 |
| 5 (control) | 64.2 | 76.8 | 81.5 | 2.2 | 0.2 | 0 | 5 | 4 |

Examples 6 and 7 exhibited superior DOI and lower haze when compared to the control of Example 5.

EXAMPLE 8–9

The following transparent polymer formulations were melt compounded in a manner similar to Examples 1 and 2:

| Component | Example 8 Weight % | Example 9 Weight % |
|---|---|---|
| Kynar 740 | 58.5 | 28.8 |
| Elvacite 2021 | 39.0 | |
| Elvacite 2009 | | 67.2 |
| Tinuvin 328 (UVA) | 1.5 | 3.0 |
| Tinuvin 622 (HAS) | 0.5 | 0.5 |
| Irganox 1010 (Antiox.) | 0.25 | 0.25 |
| Irgafos 168 (Heat Stability) | 0.25 | 0.25 |

The formulation of Example 8 was compounded to provide optimum surface wear, weathering and forming properties whereas Example 9 was compounded to provide optimum UV screening, bonding and lower cost. The transparent polymer formulations of Examples 8 and 9 were extrusion coated onto a PET carrier in a manner similar to Examples 3 and 4.

Polyezthylmethacrylate (PEMA), used heretofore in producing liquid cast films, imparts higher elongation than can be achieved with polymethylmethacrylate (PMMA), but has lower thermal stability for extrusion. However, PMMA exhibits greater clarity and hardness. The experimental samples achieved excellent clarity, gloss, DOI and abrasion resistance, along with high elongation, and a desirable balance of elongation and strength properties in the machine direction (MD) and transverse direction (TD). The balanced elongation and tensile properties provide reduced stresses and visual distortions in subsequent application and forming processes. The extruded compounds also exhibit good melt strength for thermoforming, i.e. they retain good film integrity at the thermoforming temperature without resisting the forming process.

EXAMPLE 10–12

For Example 10, a first layer of the formulation of Example 8 was extruded directly onto the PET carrier and then a second layer of the formulation of Example 9 was extruded in a second pass onto the first layer. In Example 11, the formulations of Examples 8 and 9 were coextruded onto a PET carrier with the formulation of Example 8 against the PET carrier.

The extrusion coated PET film of Example 8 was also liquid coated with black Fluorex to yield a BC/CC construction denominated Example 12. The tensile strength and percent elongation for these examples are recorded in the following table:

| Example | | Tensile (PSI) | Elongation (%) |
|---|---|---|---|
| 8 | MD | 4200 | 235 |
| | TD | 4067 | 320 |
| 9 | MD & TD | NA - brittle | NA - brittle |
| 10 | MD | 1657 | 142 |
| | TD | NA - brittle | NA - brittle |
| 11 | MD | 4000 | 75 |
| | TD | 4000 | 45 |
| 12 | MD | 3760 | 318 |
| | TD | 4214 | 355 |

As shown above, Examples 8, 11 and 12 exhibited reasonably balanced properties in the MD and TD. The coating formulation used in Example 9 and in one of the layers of Example 10 is brittle, as expected. Notably, although Examples 10 and 11 both had clear coat layers with compositions which were the same, Example 11, which was subjected to later heating when the black pigmented layer was dried, exhibited more balanced properties than Example 10, which was not subjected to later heating.

EXAMPLE 13–16

The transparent polymer formulations described in the table below were tested for extrudability by extruding from an extruder with a film die at a die temperature of 460° F.

| COMPONENT | Example 13 | Example 14 | Example 15 | Example 16 |
|---|---|---|---|---|
| KYNAR 740 | 59 | 63.9 | 48.75 | |
| KYNAR 2800 | | | 9.75 | 28.8 |
| ELVACITE 2021 | 39 | | 39 | |
| ELVACITE 2009 | | | | 67.2 |
| ELVACITE 2041 | | 34.4 | | |
| TINUVIN 900 | 1 | 1 | | |
| TINUVIN 327 | 0.25 | | | |
| TINUVIN 328 | | | 1.5 | 3 |
| TINUVIN 622 | | | 0.5 | 0.5 |
| IRGONOX 1010 | 0.25 | 0.25 | 0.25 | 0.25 |
| IRGAFOS 168 | 0.25 | 0.25 | 0.25 | 0.25 |

All films were acceptable for extrusion and confirmed the processability of the Tinuvin 900. UV screeners can be difficult to extrude without exudation or sublimation. In addition, the films exhibited acceptable abrasion resistance and hardness. Qualitative felt rub testing showed the formula of Example 13 to have an abrasion resistance superior to liquid cast PVF)F/acrylic blend clear coat formulations.

EXAMPLE 17

A blend of 60% by weight PVDF (Kynar 740 by Elf Atochem) and 40% by weight acrylic resin (Elvacite 2021 from ICI) was compounded, dried to a moisture level of 0.03% and extruded onto a two mil PET carrier (duPont Mylar D) to form an extruded clear coat layer on the carrier. For comparison, clear coat layers were formed by liquid casting onto the PET carrier the following formulations: Control A: 72% PVDF (Kynar)/28% acrylic (Elvacite 2042); Control F: 65% PVDF (Kynar)/35% acrylic resin (Acryloid A11).

The clear coat layer of each sample was coated with a pigmented base coat composition (Dark Toreador Red Metallic pigmented polymer). Gloss measurements were made as follows:

| MEASUREMENT | Control A | Control F | Example 17 |
|---|---|---|---|
| GLOSS | | | |
| 60° | 79.5 | 72.7 | 78.9 |
| 20° | 45.3 | 36.3 | 66.5 |

The DOI of each sample was measured qualitatively. All three samples had a sufficiently high DOI to show individual scalp hairs in reflected light, indicating that the DOI would be acceptable for exterior automotive purposes.

Example 17 was tested for moisture and oxygen transmission testing. Control A (72% PVDF/28% ELVACITE 2042) and Control F (65% PVDF/35% ACRYLOID A11) were also tested with the following results.

| EXAMPLE | MVTR (ASTM F1249) | OXYGEN TRANS. ASTM @ 21% | D3985 @ 100% | FILM GAUGE (MILS) |
|---|---|---|---|---|
| 17 | 3 | 1.95 | 9.32 | 1.6–1.5 |
| Control A | 4.19 | 6.15 | 29.4 | 1.85 |
| Control F | 2.19 | 1.59 | 7.60 | 1.85–1.9 |

Examples 17 and Control F were made with PMMA while Control A was made with PEMA and both have higher acrylic content. Lower MVTR and Oxygen transmission are expected to yield superior weathering protection for subsurface layers in laminated BC/CC paint film constructions.

EXAMPLE 18

Extrudable clear coat compositions, identified below as 18-1 to 18-10, were formulated to evaluate optimum scratch resistance and extruded resin throughput.

| COMPOUND | PVDF/ ACRYLIC | ACRYLIC TYPE | PVDF TYPE | STABILIZER PACKAGE |
|---|---|---|---|---|
| 18-1 | 55:45 | A | 720 | A |
| 18-2 | 55:45 | B | 740 | B |
| 18-3 | 55:45 | C | 2,800 | C |
| 18-4 | 65:35 | A | 740 | C |
| 18-5 | 65:35 | B | 2,800 | A |
| 18-6 | 65:35 | C | 720 | B |
| 18-7 | 75:25 | A | 2,800 | B |
| 18-8 | 75:25 | B | 720 | C |
| 18-9 | 75:25 | C | 740 | A |
| 18-10 | 65:35 | C | 720 | B |

Acrylic type A was copolymer of methyl methacrylate with less than about 2% ethyl acrylate comonomer (ACRYLOID A-11 from ROHM AND HAAS). It has a $T_g$ of 105° C.; a Mw between 100,000 and 150,000; and a Mn between 40,000 and 60,000. Acrylic type B was a copolymer of methyl methacrylate with about 10% ethyl acrylate comonomer (VS 100 from ATO HAAS). It has a Tg of 90° C.; a Mw of between 80,000 and 100,000; and a Mn between 30,000 and 40,000. Acrylic type C was a copolymer of methyl methacrylate with about 4.5% ethyl acrylate (ELVACITE 2021 from ICI). It has a Tg of 100° C.; a Mw which is greater than Acrylic types A or B.

PVDF types 720, 740 and 2,800 are all KYNAR grades by ELF ATOCHEM. Grades 720 and 740 are polyvinylidene fluoride, $M_w/M_n$ of 2.7 and 2.9, respectively. Kynar grade 2800 is a PVDF/HFP copolymer with $M_w/M_n$ 3.6.

The stabilizer packages were as follows:

A   T900 1%; T327 0.25%; IRG 1010 0.25%; IRGF 168 0.25%.
B   T900 1.5%; T327 0.25%; IRG 1010 0.25%; IRGF 168 0.25%.
C   T900 0.5%; TRANS TiO2 0.5%; IRG 1010 0.25%; IRGF 168 0.25%.

The melt index of the compositions (in g/10 min.) was measured at 230° C. with a 5000 gram load (ASTM D1238). The compositions were extruded into films and the viability for extrusion was evaluated.

| Sample | Melt Index | Extrudability |
|---|---|---|
| 18-1 | 28.65 | Good |
| 18-2 | 15.31 | Good |
| 18-3 | No flow | Poor |
| 18-4 | 29.75 | Good |
| 18-5 | No flow | Poor |
| 18-6 | 15.93 | Good |
| 18-7 | No flow | Poor |
| 18-8 | 24.20 | Very good |
| 18-9 | No flow | Poor |
| 18-10 | 13.48 | Fair to good |

As seen from the foregoing data, samples 18-1 to 18-10 exhibited superior gloss retention to the controls.

EXAMPLE 19

The following formula was extruded onto 142 gauge Mylar D:

| Formulation | Wt. % |
|---|---|
| Kynar 740 | 58.35 |
| VS100 | 38.90 |
| Tinuvin T900 | 1.50 |
| Tinuvin 327 | 0.50 |
| Tinuvin 622 | 0.25 |
| Irgonox 1010 | 0.25 |
| Irgofas 168 | 0.25 |

This formulation was extruded from 4½ inch and 2½ inch extruders through a Cloeren EB coextrusion die to produce a 2 mil thick monolayer coating of the formulation.

The monolayer film exhibited balanced dimensional properties and excellent clarity, gloss, DOI, abrasion resistance and toughness. The following test results were recorded:

| Gloss: | 20°–67°(Gardner Gloss Meter) |
|---|---|
| | 60°–78 to 81% |
| | DOI - 80+% |
| | (Landalt ring reflection at 4" separation) |
| Abrasion resistance: | Fluorex A Control  45 to 50%* |
| (3 weeks after | BASF BC/CC Paint Control  58 to 60% |
| laminating) | Example 19  53 to 61% |
| DSC Thermal | Tg (on set) 57.4° F. Tm (on set) 260.5° F. |
| Properties: | (mid pt) 78.1° F. (max) 320.5° F. |

| | Tensile and Elongation | |
|---|---|---|
| | T (PSI at yield) | E (%) |
| MD | 4140 | 235 |
| TD | 3573 | 236 |

*Percent gloss retained from original after 5 cycles of abrasion with a Scotch pad 7445.
Samples for gloss and abrasion testing were prepared by laminating clear film to Fluorex surfaced metal panels.

EXAMPLE 20

The fluoropolymer-rich formulation of Example 19 and an acrylic-rich polymer formulation as set forth in the table below were coextruded through the Cloeren EB extrusion die onto 142 gauge Mylar D to form a coextruded clear film layer.

| Resin Data | Formulation | Fluoropolymer Rich (Ex. 19) | Acrylic Rich |
|---|---|---|---|
| | Kynar 740 | 58.35 | 33.50 |
| | VS100 | 38.90 | |
| | Elvacite 2009 | | 62.40 |
| | Tinuvin T900 | 1.50 | |
| | Tinuvin 328 | | 3.00 |
| | Tinuvin 327 | 0.50 | |
| | Tinuvin 622 | 0.25 | 0.50 |
| | Irgonox 1010 | 0.25 | 0.25 |
| | Irgofas 168 | 0.25 | 0.25 |
| | Melt Flow Rate: | 2075-30-28 - 27.3 (g/10 min.) 2075-13B - 33 (ASTM D1238 at 230° C./5 kg weight) | |

After press polishing against the Mylar temporary backing layer and coating with a pigmented Base Coat, the extruded film yields excellent clarity, gloss and DOI. The coextruded clear film layer exhibits balanced dimensional properties with good elongation and toughness.

The relatively good balance in MD and TD properties, similar to liquid casting, are not typical for extruded films. MD/TD balance, relatively low tensile strength, and low TG are important for in mold film formability.

In the drawings and specification, specific embodiments of the invention have been disclosed. Although specific terms are employed, they are used in a generic and descriptive sense only and not for purposes of limitation, the scope of the invention being set forth in the following claims.

That which is claimed is:

1. A method for making a flexible composite surfacing film for providing a substrate with desired surface characteristics comprising the steps of:

extruding a molten transparent thermoplastic polymer comprising at least one of a fluoropolymer and an acrylic polymer;

applying the extruded transparent thermoplastic polymer to a flexible temporary carrier and forming thereon a continuous thin film of the transparent thermoplastic polymer releasably bonded to the flexible temporary carrier;

applying a pigmented thermoplastic dispersion comprising at least one of a fluoropolymer and an acrylic polymer in a volatile liquid vehicle to the exposed surface of the transparent film while the film is bonded to the flexible temporary carrier and forming thereon a coating of the pigmented thermoplastic polymer overlying the transparent thermoplastic polymer film;

heating the thus formed composite while the transparent thermoplastic polymer film is bonded to the flexible temporary carrier to evaporate the volatile liquid vehicle and form a pigmented polymer layer and also to molecularly relax the underlying extruded thin film of transparent thermoplastic polymer such that the transparent thermoplastic polymer exhibits thermal dimensional stability at 350° F.;

laminating a thermoformable backing layer to the pigmented polymer coating and subsequently stripping the flexible temporary carrier from the transparent thermoplastic polymer film to thereby provide a thermoformable composite film laminate having the desired surface characteristics; and wherein the process provides a composite surfacing film with a DOI of at least 65% as measured in the absence of the temporary carrier.

2. A method according to claim 1 wherein said steps of extruding and applying the transparent thermoplastic polymer comprise extruding the molten thermoplastic polymer from a slot die directly onto the exposed surface of the flexible temporary carrier.

3. A method according to claim 1 wherein said steps of extruding and applying the transparent thermoplastic polymer comprise extruding the molten transparent thermoplastic polymer from a slot die onto a rotating roll and then transferring the transparent thermoplastic polymer from the roll to the flexible temporary carrier.

4. A method according to claim 3 further comprising the step of heating the rotating roll.

5. A method according to claim 1 wherein said laminating step comprises providing a preformed sheet of a thermoformable thermoplastic polymer having a thickness of from about 0.5 to 100 thousandths of an inch, applying an adhesive to at least one of the corresponding surfaces of the preformed sheet and the pigmented layer, and bringing the surfaces into bonding contact with one another.

6. A method according to claim 5 wherein said laminating step further comprises subjecting the exposed surface of the pigmented layer to corona treatment before said adhesive application step.

7. A method according to claim 1 wherein said heating step comprises heating the composite to a temperature above the Tg of the extruded transparent thermoplastic polymer.

8. A method according to claim 1 wherein said heating step comprises heating the composite to a temperature near the onset of melting of the extruded transparent thermoplastic polymer.

9. A method according to claim 1 wherein said step of extruding a molten transparent thermoplastic polymer comprises extruding first and second transparent thermoplastic polymers of differing compositions to form a continuous thin transparent film having outer and inner layers with different properties.

10. A method according to claim 9 wherein said step of extruding first and second transparent thermoplastic polymers comprises coextruding the first and second polymers from the same die block.

11. A method according to claim 1 wherein said step of applying the transparent thermoplastic polymer to a flexible temporary carrier comprises directing the first extruded transparent thermoplastic polymer into contact with an exposed surface of the temporary carrier to form the outer layer and then directing the second extruded transparent thermoplastic polymer into contact with the outer layer to form the inner layer.

12. A method according to claim 1 wherein said step of applying a pigmented thermoplastic polymer in a volatile liquid vehicle comprises discharging the pigmented polymer and liquid vehicle from a slot die to form a thin coating overlying the film of transparent thermoplastic polymer.

13. A method according to claim 1 wherein said step of applying a pigmented thermoplastic polymer in a volatile liquid vehicle comprises reverse roll coating the pigmented polymer and liquid vehicle onto the film of transparent thermoplastic polymer to form a thin coating.

14. A method according to claim 1 wherein said step of applying a pigmented thermoplastic polymer in a volatile liquid vehicle comprises rotary screen printing the pigmented polymer and liquid vehicle onto the film of transparent thermoplastic polymer to form a thin coating.

15. A method according to claim 1 wherein the step of applying the extruded transparent thermoplastic polymer to a flexible temporary carrier comprises applying the polymer to a surface of the flexible temporary carrier having such a smoothness that the resultant composite surfacing film has the appearance of a glossy base coat/clear coat automotive paint finish with a 20° gloss of at least about 60% after the temporary carrier has been stripped from the transparent thermoplastic film.

16. A method according to claim 15 wherein the surface of the flexible temporary carrier adjacent the transparent thermoplastic polymer film has an average surface roughness of less than 0.018 µm.

17. A method according to claim 1 wherein the step of applying the extruded transparent thermoplastic polymer to a flexible temporary carrier comprises applying the polymer to a surface of the flexible temporary carrier having such a smoothness that the resultant composite surfacing film has the appearance of a glossy base coat/clear coat automotive paint finish with a DOI of at least about 65% after the temporary carrier has been stripped from the transparent thermoplastic film.

18. The method according to claim 1 wherein the pigmented thermoplastic dispersion further contains reflective flakes.

19. The method according to claim 18 wherein the reflective flakes present in the coating of pigmented thermoplastic polymer are substantially parallel to the exposed surface of the transparent film.

20. A method for making a flexible weatherable composite surfacing film for providing a substrate with desired surface characteristics comprising the steps of:
  extruding a molten transparent thermoplastic polymer blend of a fluorinated polymer polymer and an acrylic resin;
  applying the extruded transparent thermoplastic polymer blend to a flexible temporary carrier and forming thereon a continuous film of the transparent polymer of a thickness of about 12.7 to 250 µm releasably bonded to the flexible temporary carrier;
  forming a coating of a pigmented thermoplastic polymer dispersion comprising at least one of a fluoropolymer and an acrylic polymer in a volatile liquid vehicle of a thickness of about 12.7 to 100 µm on the exposed surface of the transparent film while the film is bonded to the flexible temporary carrier;
  heating the thus formed composite to a temperature above the Tg of the extruded transparent thermoplastic polymer blend while the transparent thermoplastic polymer film is bonded to the flexible temporary carrier to molecularly relax the extruded film of transparent thermoplastic polymer such that the transparent thermoplastic polymer exhibits thermal dimensional stability at 350° F.
  allowing the thus formed composite film to cool;
  laminating a thermoformable backing to the pigmented polymer coating and subsequently stripping the flexible temporary carrier from the transparent thermoplastic polymer film to thereby provide a thermoformable composite film laminate having the desired surface characteristics; and
  wherein the resulting composite surfacing film has a DOI of at least 65% as measured in the absence of the temporary carrier.

21. A method according to claim 20 wherein said steps of extruding and applying the transparent thermoplastic polymer comprise extruding the molten thermoplastic polymer from a slot die directly onto the surface of the flexible temporary carrier.

22. A method according to claim 20 wherein said steps of extruding and applying the transparent thermoplastic polymer comprise extruding the molten transparent thermoplastic polymer from a slot die onto a rotating roll and then transferring the transparent thermoplastic polymer from the roll to the flexible temporary carrier.

23. A method according to claim 22 further comprising the additional step of heating the rotating roll.

24. A method tar making a flexible composite surfacing film for providing a substrate with the appearance of a glossy base coat/clear coat automotive paint finish with a high gloss and distinctness of image comprising the steps of:
  extruding a molten transparent thermoplastic polymer comprising at least one of a fluoropolymer and an acrylic polymer;
  applying the extruded transparent thermoplastic polymer to a smooth surfaced flexible temporary carrier of polyethylene terephthalate having an average surface roughness of less than 0.013 µm and forming thereon a continuous thin transparent film releasably bonded to the flexible temporary carrier;
  applying a pigmented thermoplastic polymer in a volatile liquid vehicle to the exposed surface of the transparent film while the film is bonded to the flexible temporary carrier and forming thereon a coating of the pigmented thermoplastic polymer overlying the transparent thermoplastic polymer film;
  heating the thus formed compositg while the transparent thermoplastic polymer film is bonded to the flexible temporary carrier to evaporate the volatile liquid vehicle and form a pigmented polymer layer and also to molecularly relax the underlying film of transparent thermoplastic polymer;
  allowing the thus formed composite film to cool;
  laminating a thermoformable backing layer to the pigmented layer; and
  stripping the flexible temporary carrier from the transparent thermoplastic polymer film to thereby provide a thermoformable composite film laminate having a DOI of at least 65%.

25. A method for making a flexible composite surfacing film for providing a substrate with desired surface characteristics comprising the steps of:
  directing a flexible temporary carrier into running contact with a rotating roll so as to form a converging throat at the point that the temporary carrier runs onto the rotating roll;
  extruding a molten transparent thermoplastic polymer comprising at least one of a fluoropolymer and an acrylic polymer from an extrusion die;
  directing the extruded polymer into the converging throat so that it becomes sandwiched between the flexible temporary carrier and the rotating roll;
  passing the flexible temporary carrier around a circumferential portion of the rotating roll and forming therebetween a continuous thin transparent film releasably bonded to the flexible temporary carrier;
  forming a coating of a pigmented thermoplastic polymer on the exposed surface of the transparent film at a location downstream of the rotating roll and while the film is bonded to the flexible temporary carrier, said pigmented thermoplastic polymer comprising at least one of a fluoropolymer and an acrylic polymer;
  heating the thus formed composite while the transparent thermoplastic polymer film is bonded to the flexible temporary carrier to molecularly relax the extruded film of transparent thermoplastic polymer such that the transparent thermoplastic polymer exhibits thermal dimensional stability at 350° F.;

allowing the thus formed composite film to cool; and laminating a thermoformable backing layer to the pigmented layer; and stripping the flexible temporary carrier from the transparent thermoplastic polymer film to thereby provide a thermoformable composite film laminate having a DOI of at least 65%.

26. A method according to claim 25 wherein said extrusion step comprises extruding the transparent thermoplastic polymer directly into the converging throat.

27. A method according to claim 25 wherein said extrusion step comprises extruding the transparent thermoplastic polymer onto the exposed surface of the flexible temporary carrier at a location upstream of the converging throat, and wherein said step of directing the extruded polymer into the converging throat comprises advancing the temporary carrier with the extruded transparent polymer thereon into the converging throat.

28. A method according to claim 25 wherein said extrusion step comprises extruding the transparent thermoplastic polymer onto the exposed surface of the rotating roll upstream of the converging throat, and wherein said step of directing the extruded polymer into the converging throat comprises rotating the roll with the extruded transparent polymer thereon to advance the extruded polymer into the converging throat.

29. A method according to claim 28 comprising the additional step, of heating the rotating roll.

30. A method according to claim 25 wherein said step of extruding a molten transparent thermoplastic polymer comprises extruding first and second transparent thermoplastic polymers of differing compositions to form a continuous thin transparent film having outer and inner layers with different properties.

31. A method according to claim 25 wherein said step of directing a flexible temporary carrier into running contact with a rotating roll so as to form a converging throat comprises directing the carrier first into running contact with another roll positioned adjacent said first-mentioned rotating roll in spaced relation thereto to form a nip, and simultaneously rotating said rolls to advance the flexible temporary carrier over a circumferential portion of said other roll, through said nip, and then onto and around said circumferential portion of said first-mentioned roll.

32. A method according to claim 25 wherein the step of directing a flexible temporary carrier into running contact with a rotating roll comprises directing a smooth surfaced polyethylene terephthalate film having an average surface roughness of less than 0.018 µm into contact with the running roll with said smooth surface thereof oriented away from the roll and exposed for contacting the extruded polymer so that surface of the thin transparent film which contacts the temporary film is also smooth and the resultant composite surfacing film has the appearance of a glossy base coat/clear coat automotive paint finish after the temporary carrier has been stripped from the transparent thermoplastic film.

* * * * *

UNITED STATES PATENT AND TRADEMARK OFFICE
CERTIFICATE OF CORRECTION

PATENT NO. : 5,985,079
DATED : November 16, 1999
INVENTOR(S) : Ellison

It is certified that error appears in the above-identified patent and that said Letters Patent is hereby corrected as shown below:

Columns 12 - 16, in the sub-headings, "EXAMPLE" should read --EXAMPLES--.

Column 20, line 42, "claim 1" should read --claim 9--.

Column 21, line 31, cancel "polymer", second occurrence.

Column 22, line 9, "tar" should read --for--; line 28, "compositg" should read --composite--.

Column 23, last line, after "step" cancel the comma (,).

Signed and Sealed this

Thirtieth Day of May, 2000

Attest:

Attesting Officer

Q. TODD DICKINSON

Director of Patents and Trademarks